(Specimens.)

H. E. MILLER.
PROCESS OF MANUFACTURING MIRROR BACKS FROM PLASTIC MATERIAL AND THE PRODUCT THEREOF.

No. 345,982. Patented July 20, 1886.

WITNESSES:
A. L. Shaw
George Cook.

INVENTOR
Horace E. Miller,
BY
Chas. B. Gill
ATTORNEY

UNITED STATES PATENT OFFICE.

HORACE E. MILLER, OF NEWARK, NEW JERSEY, ASSIGNOR OF ONE-HALF TO JOHN L. FERGUSON, OF LARCHMONT MANOR, NEW YORK.

PROCESS OF MANUFACTURING MIRROR-BACKS FROM PLASTIC MATERIAL AND THE PRODUCT THEREOF.

SPECIFICATION forming part of Letters Patent No. 345,98', dated July 20, 1886.

Application filed January 13, 1886. Serial No. 188,423. (No specimens.)

*To all whom it may concern:*

Be it known that I, HORACE E. MILLER, a citizen of the United States, and a resident of Newark, in the county of Essex and State of New Jersey, have invented certain new and useful Improvements in the Process of Manufacturing Mirror-Backs from Plastic Material and the Product Thereof, of which the following is a specification.

The invention relates to an improved process of manufacturing mirror-backs from plastic material and to the product thereof; and it consists, essentially, in welding thin blanks of celluloid or other plastic material by means of heat and pressure upon the sides and edges of a core of less expensive material, having a seat for the mirror, the purpose being to produce a mirror-back which will possess all of the desirable characteristics of one made wholly of celluloid, but which as an article will be less expensive than the solid celluloid back, and may be manufactured more rapidly and by methods less dangerous and costly than those heretofore practiced.

The process of manufacture and its advantages will be more fully understood from the detailed description hereinafter presented, reference being had to the accompanying drawings, in which—

Figure 1:
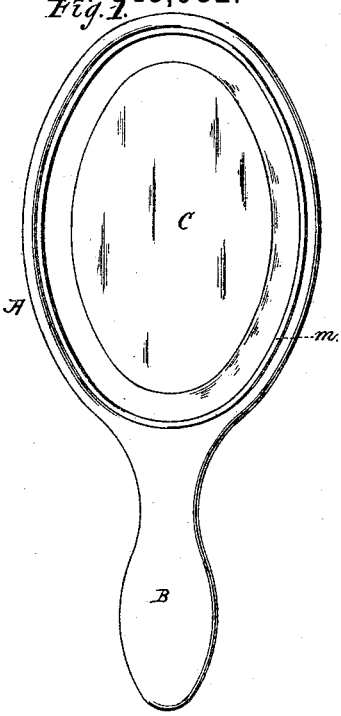
Figure 2:
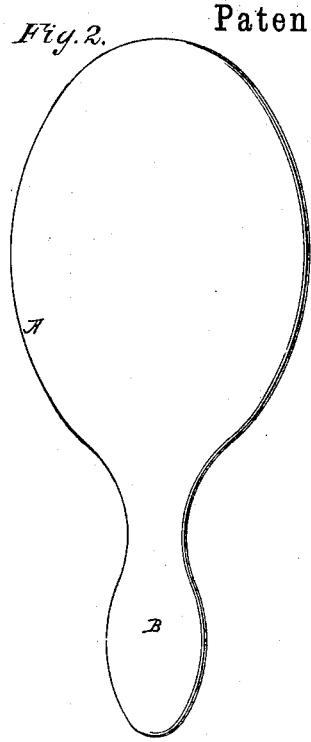
Figure 3:
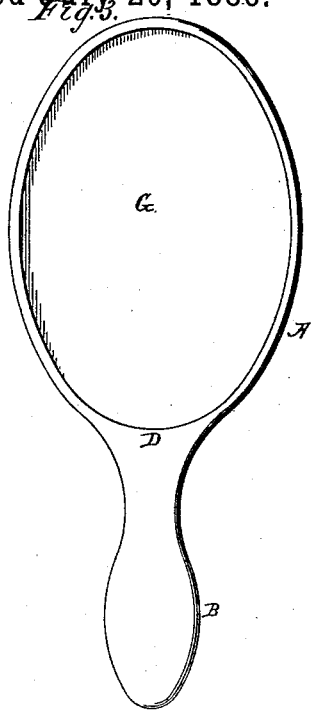
Figure 4:
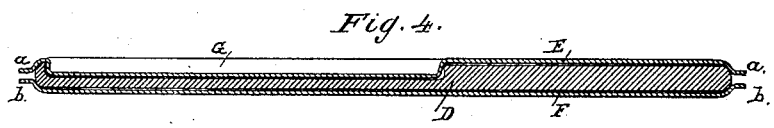
Figure 5:
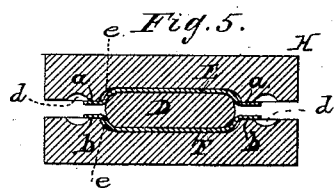
Figure 6:
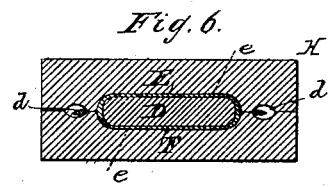
Figure 7:
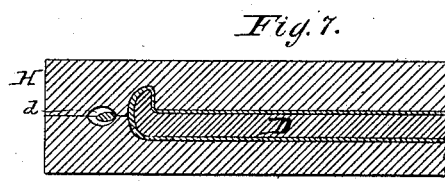
Figure 8:
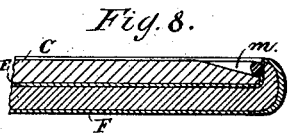
Figure 9:
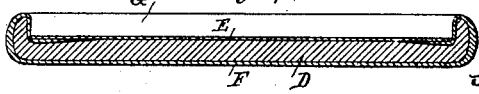

Figure 1 is a face view of a finished mirror and back made according to the invention. Fig. 2 is a rear view of same. Fig. 3 is a face view of the core forming a part of the mirror-back. Fig. 4 is a central vertical longitudinal section of the core and celluloid blanks, the illustration being presented to indicate the relation of the parts named when they are in condition to be subjected to pressure in the heated molds. Fig. 5 is a central vertical section, on an enlarged scale, through the handle portion of the core and blanks in position in the mold before pressure has been applied thereto. Fig. 6 is a like view of same after the pressure has been applied. Fig. 7 is a similar view through a portion of the mold and body of the mirror-back. Fig. 8 is a vertical transverse section through a portion of the body of the completed article, showing the glass in position. Fig. 9 is a central vertical transverse section through the body of the mirror-back, and illustrates a step, hereinafter pointed out, in the process of applying the celluloid.

In the drawings, A denotes the body of the mirror-back; B, the handle of same; C, the mirror; D, the core of wood or inferior material; and E F, respectively, the thin blanks of celluloid or other plastic material by which the core is covered.

The core D will preferably be a single piece of wood conforming to the outline of the mirror-back to be produced, and will be provided with the seat G for the glass C. The blanks of celluloid, E F, will be given the form of the upper and lower surfaces of the core D, and arranged in position, as shown in Fig. 4, upon opposite sides of the core preparatory to the introduction of the whole into the mold H. The edges of the blanks E F prior to their subjection with the core to heat and pressure will be slightly separated from each other, and will project horizontally outward, forming lips $a\ b$, as indicated in Figs. 4 and 5, which will be caught by the meeting surfaces of the mold between the overflow $d$ and matrix $e$. The width of the matrix $e$ is slightly greater than that of the wooden core, the object of this arrangement being to produce a greater thickness of the plastic material around the edges of the back than at its upper and lower surfaces. After the blanks and core have been placed in the molds the latter are subjected to pressure between heated surfaces of any suitable description, the heat and pressure being sufficient to compress the wooden core and cause the celluloid to become softened and firmly unite with the surfaces of the core and flow around its edges, closing the space between the blanks, and causing them to weld together. The core, when withdrawn from the mold, will be found to be completely covered with the celluloid, and in condition to receive the glass C and fastening-ring of celluloid, $m$, which is cemented in a groove prepared to receive it, as shown in Fig. 8.

The mirror-back made in the manner described is particularly desirable, since the celluloid will not crack or break when subjected to changes of temperature. It is impervious to moisture, and hence the core will be effectually protected; and the celluloid on the core, being in thin sheets, is inexpensive, and not liable to shrink or warp. The celluloid firmly unites with the surfaces of the core, and will not separate therefrom during the use of the mirror; but, on the contrary, the the core and celluloid, after their removal from the molds, form a solid compressed article of increased strength and durability.

It Fig. 9 it will be observed that the sheet of celluloid in the seat G is thinner than that on the back of the core, and this is due to the fact that, since but very little celluloid is required underneath the glass C, the central portion of the blank E in the seat G has been cut out and removed and a thinner piece of celluloid substituted. The thin piece will protect and unite with the core, and weld at its edges with the blank E. The step of the process illustrated in Fig. 9 is desirable, perhaps, only on the ground of economy, and may be followed or not, as may be desired.

During the process of manufacture I prefer to give the blanks E F substantially the conformation of the upper and lower sides of the core D before they are applied to the latter; but this, though desirable, is not absolutely essential, and the blanks may be employed in the form of plain flat sheets.

The process of manufacture indicated above possesses many advantages over the methods necessary to be followed in manufacturing solid celluloid mirror-backs, and principally among these it may be mentioned that the thin sheets season more quickly than the thick blocks necessary for solid backs, the latter requiring about six weeks' treatment before being finished for the market; that the solid backs require heavier and more expensive molds than the backs made according to the invention sought to be protected hereby; that the method of manufacturing pyroxyline mirror-backs heretofore practiced necessitated the carrying in stock of large quantities of the material, which is a great objection, and that the manufacture of the solid backs involves an increased expenditure of labor, material, care, and money, without any corresponding advantages over the back having a core, hereinbefore described.

It will be found desirable in manufacturing mirror-backs according to the present invention to apply a coating of celluloid, cement, or other solvent of pyroxyline to the inner faces of the blanks E F, for the purpose of insuring their firm union to the core D and the welding together of their edges while in the molds.

What I claim as my invention, and desire to secure by Letters Patent, is—

1. The process hereinbefore described of manufacturing mirror-backs, which consists in first providing a core of inferior material having a seat for the mirror, then arranging blanks of celluloid or other plastic material upon opposite sides of the core, and finally subjecting the whole to heat and pressure to complete the article.

2. The process hereinbefore described of manufacturing mirror-backs, which consists in first providing a core of inferior material having a seat for the mirror, then arranging blanks of celluloid or other plastic material upon opposite sides of the core, the blanks conforming to the configuration of the core, and finally subjecting the whole to heat and pressure.

3. The process hereinbefore described of manufacturing mirror-backs, which consists in first providing a core of wood in the outline of the article and having a seat to receive the mirror, then arranging blanks of pyroxyline compounds on opposite sides of the core, and finally subjecting the whole to heat and pressure, whereby the blanks are caused to unite with each other and with the core, and the latter is compressed.

4. As an article of manufacture, a mirror the back of which has a seat, G, and consists of a core of inferior material and an exterior coating of celluloid or analogous material, the latter being applied to the former by heat and pressure, substantially as set forth.

5. As an article of manufacture, a mirror the back of which has a seat for the glass, and consists of the wooden core and celluloid or analogous coating, applied thereto by heat and pressure.

6. As an article of manufacture, a mirror the back of which consists of the core D, having seat G, and the celluloid coating E F, applied by heat and pressure, the celluloid being of greater thickness along the edges of the core than elsewhere, substantially as set forth.

Signed at New York, in the county of New York and State of New York, this 11th day of January, A. D. 1886.

HORACE E. MILLER.

Witnesses:
CHAS. C. GILL,
J. L. FERGUSON.